United States Patent [19]

Cataldo

[11] Patent Number: 4,486,185
[45] Date of Patent: Dec. 4, 1984

[54] FRICTION DRIVE CHAIN

[75] Inventor: Roy S. Cataldo, Birmingham, Mich.

[73] Assignee: General Motors Corporation, Detroit, Mich.

[21] Appl. No.: 541,549

[22] Filed: Oct. 13, 1983

[51] Int. Cl.³ .............................................. F16G 1/00
[52] U.S. Cl. .................................... 474/201; 474/245
[58] Field of Search ............ 474/201, 202, 242, 244, 474/245

[56] References Cited

U.S. PATENT DOCUMENTS

| 765,819 | 7/1904 | Cutter | 474/245 |
| 1,096,851 | 5/1914 | McClatchey | |
| 4,313,730 | 2/1982 | Cole et al. | 474/201 |
| 4,392,843 | 7/1983 | Smit | 474/245 |

FOREIGN PATENT DOCUMENTS 278164  1/1913  Fed. Rep. of Germany ...... 474/245

Primary Examiner—Stephen J. Novosad
Assistant Examiner—Frank H. McKenzie, Jr.
Attorney, Agent, or Firm—Donald F. Scherer

[57] ABSTRACT

A friction drive chain for use with V-groove pulleys has a plurality of drive blocks mounted on a core strand. The core strand is comprised of a plurality of pivotally connected cylindrical core members. The drive blocks are secured to respective core members by centrally located retention clips which are disposed in an inner groove in each block and an outer groove in each core member. The clips also provide the drive connection between respective drive blocks and the core members.

2 Claims, 5 Drawing Figures

FRICTION DRIVE CHAIN

This invention relates to friction drive chains and more particularly to such drive chains having a plurality of blocks mounted on a core member.

Prior art friction drive chains generally provide a core member comprised of pivotally connected chain links. These links are joined at the pivot location by pin members. Driving blocks are mounted on the core member and retained longitudinally by the pin members. These pin members also transmit the driving forces from the blocks to the core member. The use of this type of construction requires that the drive blocks be placed on the core member at final assembly. Thus, individual core member and drive block combinations cannot be preassembled.

Since the friction chains are comprised of a plurality of drive blocks disposed between adjacent pin members, the tolerances of prior art individual drive blocks must be closely held to reduce relative movement between the blocks and the core member.

The present invention provides a retaining clip or C-ring which is engaged in an annular groove formed on the outer cylindrical surface of a core member and an annular groove formed in an inner surface of a drive block. The individual drive block and core member components can be preassembled such that at final assembly, only the adjacent core members need be secured together by pivot pin members.

It is therefore an object of this invention to provide an improved friction drive chain wherein each drive block is secured to a respective core member by a retention clip disposed in annular grooves formed in the interior of the drive block and on the exterior of the core member.

It is another object of this invention to provide an improved friction drive chain comprised of a plurality of drive blocks mounted on respective interconnected core members wherein each drive block has a longitudinal central cylindrical opening and each core member has a cylindrical outer surface disposed adjacent each respective opening and wherein respective drive blocks and core members are secured together by a retention clip disposed in the annular grooves which are formed substantially centrally in the central opening and the outer surface.

These and other objects and advantages of the present invention will be more apparent from the following specification and drawings in which.

Figure 1:
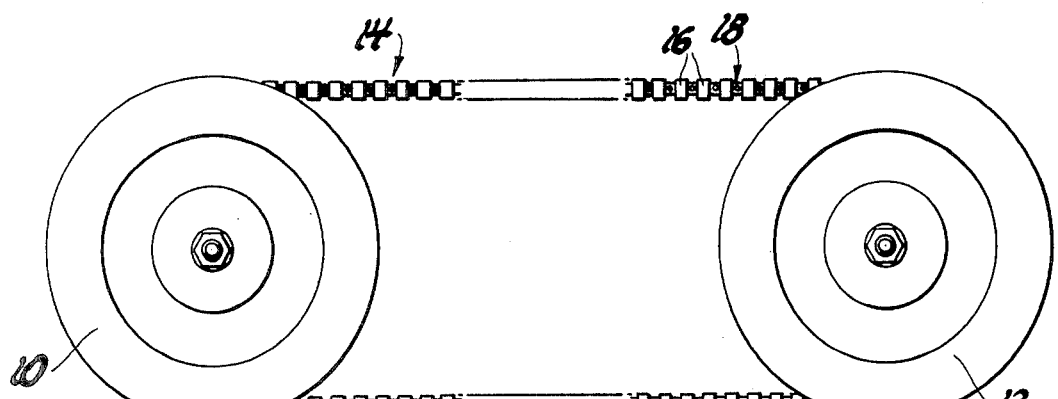
FIG. 1 is a plan view of a pulley drive system.

Referring to the drawings, wherein like characters represent the same or corresponding parts throughout the several views, there is seen in FIG. 1 a pair of V-groove pulleys 10 and 12 interconnected by a drive chain 14. The drive chain 14 frictionally engages the pulleys 10 and 12 to transmit drive forces therebetween in a well-known manner. The drive chain 14 is comprised of a plurality of drive blocks 16 which are disposed on a core member 18 which is formed from a plurality of interconnected link members 20.

Figure 3:
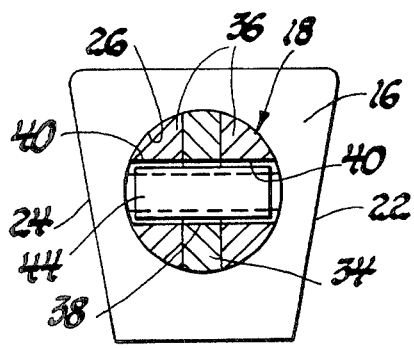
FIG. 3 is a sectional view taken along line 3—3 of FIG. 2.
Figure 4:
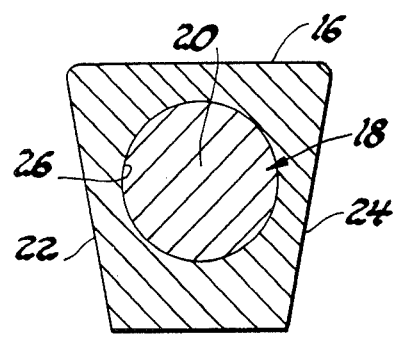
FIG. 4 is a sectional view taken along line 4—4 of FIG. 2.
Figure 5:
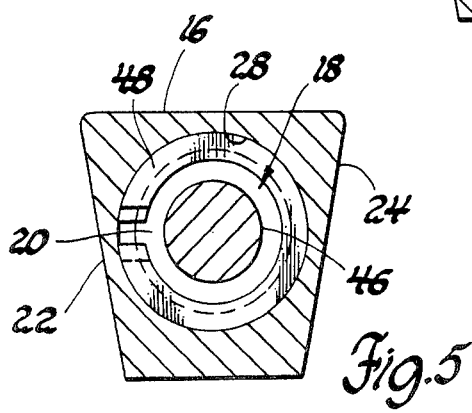
FIG. 5 is a sectional view taken along line 5—5 of FIG. 2.

As seen in FIGS. 3, 4 and 5, each drive block 16 is trapezoidal in cross section and has a pair of driving faces 22 and 24 which cooperate in a well-known manner with the V-groove of pulleys 10 and 12. Each drive block 16 has a longitudinal cylindrical opening 26 which extends the entire length of the block 16. Each block 16 also includes an annular groove 28 which is disposed centrally of the longitudinal dimension of cylindrical opening 26.

Each core member 20 has a cylindrical portion 30. The ends of each core member 20 is comprised of either a tongue member 34 or a bifurcated portion 36. The tongue 34 and bifurcated portion 36 of adjacent core members intermesh, as seen in FIG. 3. The tongue 34 and bifurcated portion 36 each have formed therein openings 38 and 40, respectively. At assembly of the chain 14, these openings 38 and 40 are aligned such that pivot pin members 42 and 44 can be pressed therein to secure adjacent link members 20 together in pivotal relationship to form the continuous core member 18.

Figure 2:
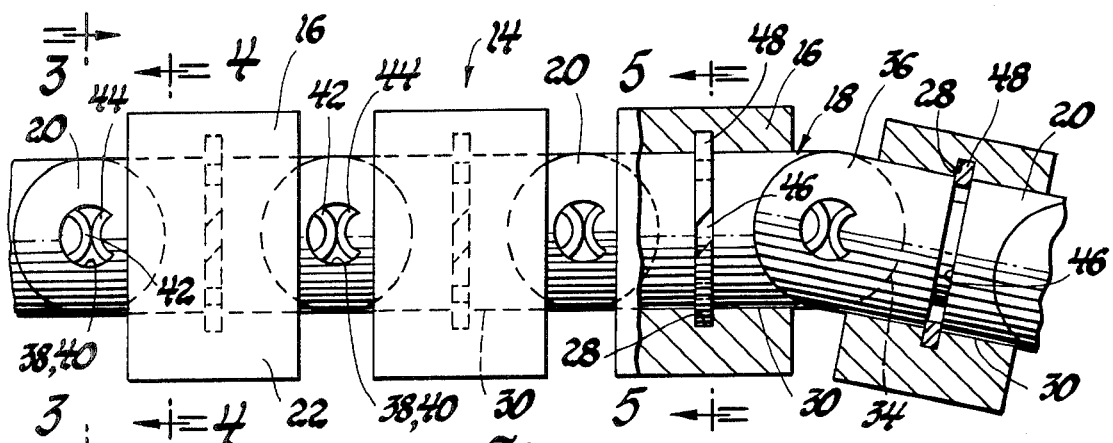
FIG. 2 is an enlarged view of a portion of the chain shown in FIG. 1.

Each link member 20 has formed therein an annular groove 46 which is substantially centrally disposed on the longitudinal dimension of cylindrical portion 30. The groove 46, as seen in FIG. 2, is aligned with the groove 28. A C-clip or retention clip 48 is disposed in the grooves 28 and 46 such that each drive block 16 is secured to a respective link member 20. The annular groove 46 has a depth dimension which is sufficient to house the radial thickness of the retention clip 48 such that the clip 48 can be held compressed in the groove 46 to permit assembly of the drive block 16 onto the link member 20.

During assembly of the drive block 16 and link member 20, the grooves 28 and 46 will come into alignment and the inherent spring force in retention clip 48 will cause radially outward expansion thereof so that the block 16 and member 20 are secured together to prevent relative longitudinal movement. Each drive block 16 is preferably mounted on the respective link member 20 prior to the final assembly of chain 14, which assembly occurs when pivot pins 42 and 44 are placed in openings 38 and 40.

When the drive chain 14 transmits drive forces between the pulleys 10 and 12, the drive forces are transmitted between drive blocks 16 and core member 18 through the retention clips 48, while the pins 42 and 44 permit chordal action of the core member 18 as the drive blocks 16 are brought into and out of contact with the pulley members 10 and 12 and transmit drive forces between the link members 20.

If desired, the retention clips 48 can be designed to have a wave or spring pattern which will accommodate the production tolerances of grooves 28 and 46 to substantially eliminate any longitudinal movement between link members 20 and drive blocks 16.

Since the individual link members 20 do not have to be assembled into a chain until the final assembly procedure is undertaken, it is not necessary to inventory chains of various lengths thus reducing inventory costs while not substantially increasing the time required to satisfy production orders.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A friction drive chain comprising a plurality of substantially cylindrical core members; means pivotally connected adjacent core members; a plurality of drive blocks each having a longitudinally extending cylindrical passage means for permitting each drive block to be mounted on a respective core member and a pair of external drive surfaces adapted to frictionally engage a pulley; annular groove means formed in the interior of each drive block perpendicular to the longitudinal direction of said passage means; annular groove means formed on the exterior of each core member perpendicular to the longitudinal dimension thereof; and retention clip means disposed in the annular grooves of respective pairs of said core members and said drive block for positioning and retaining each said drive block on the respective core member and for transmitting drive forces applied to the external drive surfaces to said respective core members.

2. A friction drive chain comprising a plurality of substantially cylindrical core members; means pivotally connecting adjacent core members; a plurality of drive blocks each having a longitudinally extending cylindrical passage means for permitting each drive block to be mounted on a respective core member and a pair of external drive surfaces adapted to frictionally engage a pulley; an annular groove formed in the interior of each drive block perpendicular to and substantially central of the longitudinal direction of said passage means; annular groove means formed on the exterior of each core member perpendicular to and substantially central of the longitudinal dimension thereof; and retention C-clip means disposed simultaneously in the annular grooves of respective pairs of said core members and said drive block for positioning and retaining each said drive block on the respective core member and for transmitting drive forces applied to the external drive surfaces to said respective core members.

* * * * *